US012654941B2

(12) United States Patent (10) Patent No.: US 12,654,941 B2
Ma et al. (45) Date of Patent: Jun. 16, 2026

(54) METHOD AND DEVICE FOR HANDLING MATERIAL

(71) Applicant: Beijing Jingdong Zhenshi Information Technology Co., Ltd., Beijing (CN)

(72) Inventors: Bin Ma, Beijing (CN); Jian Gong, Beijing (CN); Zhuo Meng, Beijing (CN)

(73) Assignee: BEIJING JINGDONG ZHENSHI INFORMATION TECHNOLOGY CO., LTD., Beijing (CN)

( * ) Notice: Subject to any disclaimer, the term of this patent is extended or adjusted under 35 U.S.C. 154(b) by 657 days.

(21) Appl. No.: 18/005,008

(22) PCT Filed: Apr. 30, 2021

(86) PCT No.: PCT/CN2021/091323
§ 371 (c)(1),
(2) Date: Jan. 10, 2023

(87) PCT Pub. No.: WO2022/037125
PCT Pub. Date: Feb. 24, 2022

(65) Prior Publication Data
US 2024/0034561 A1 Feb. 1, 2024

(30) Foreign Application Priority Data
Aug. 17, 2020 (CN) .......................... 202010824602.4

(51) Int. Cl.
*B65G 1/137* (2006.01)
(52) U.S. Cl.
CPC .................................. *B65G 1/1375* (2013.01)
(58) Field of Classification Search
CPC .................................................. B65G 1/1375
See application file for complete search history.

(56) References Cited

U.S. PATENT DOCUMENTS 8,135,495 B2 * 3/2012 Driskill .................. G06Q 10/06
700/218
10,332,066 B1 * 6/2019 Palaniappan .......... G01G 19/42
(Continued)

FOREIGN PATENT DOCUMENTS

CN 106339842 A 1/2017
CN 106779751 A 5/2017
(Continued)

OTHER PUBLICATIONS

Zhang, "A New Chapter of Intelligent Storage—Unmanned Management of Production Material Warehouse in Factory", Tianjin Science & Technology, Jul. 2020, vol. 47, No. 7, (3 pages).
(Continued)

*Primary Examiner* — Kyle O Logan
(74) *Attorney, Agent, or Firm* — Venable LLP; Ryan Ward

(57) ABSTRACT

A method and an electronic device for handling a material are provided. The method may include: obtaining a picking task for a target material at a target warehouse; using, in response to determining that a target person arrives at an exit location of the target warehouse, material information of a material held by the target person as target material information, the material information including a material identifier and a material quantity; and comparing material information of a to-be-picked material in the picking task with the target material information, and subtracting the material information of the to-be-picked material from stock information of the target warehouse if a comparison result is that the material information and the target material information are consistent.

19 Claims, 7 Drawing Sheets

(56) References Cited

U.S. PATENT DOCUMENTS

| | | | | |
|---|---|---|---|---|
| 2010/0241269 A1* | 9/2010 | Ham | ................. | G06Q 30/0601 |
| | | | | 700/214 |
| 2014/0088758 A1* | 3/2014 | Lert | ...................... | B65G 1/065 |
| | | | | 700/214 |
| 2016/0101936 A1* | 4/2016 | Chamberlin | ......... | G05B 19/402 |
| | | | | 700/214 |
| 2020/0272970 A1* | 8/2020 | Willard, III | ........ | G06Q 30/0635 |
| 2021/0233013 A1* | 7/2021 | Liang | ..................... | G06Q 10/06 |
| 2025/0250050 A1* | 8/2025 | Mcmahan | ................. | B65B 5/08 |

FOREIGN PATENT DOCUMENTS

| | | | |
|---|---|---|---|
| CN | 107437162 | A | 12/2017 |
| CN | 107506968 | A | 12/2017 |
| CN | 108288136 | A | 7/2018 |
| CN | 108364149 | A | 8/2018 |
| CN | 108550008 | A | 9/2018 |
| CN | 109299903 | A | 2/2019 |
| CN | 109492724 | A | 3/2019 |
| CN | 109523210 | A | 3/2019 |
| CN | 109658017 | A | 4/2019 |
| CN | 109886625 | A | 6/2019 |
| CN | 110033061 | A | 7/2019 |
| CN | 110135324 | A | 8/2019 |
| CN | 110400110 | A | 11/2019 |
| CN | 111242546 | A | 6/2020 |
| CN | 111915264 | | 11/2020 |
| JP | 2000-062920 | A | 2/2000 |
| JP | 2000-344312 | A | 12/2000 |
| JP | 2003-327331 | A | 11/2003 |
| JP | 2010-037104 | A | 2/2010 |
| JP | 2014-091608 | A | 5/2014 |
| KR | 101675987 | B1 | 11/2016 |
| WO | 2019/184646 | A1 | 10/2019 |

OTHER PUBLICATIONS

Zhiying, "The Warehouse Safekeeping Management System Based on Video Content Analysis Technology", 2010 International Conference on Intelligent Computation Technology and Automation, 2010, (4 pages).

Chinese Office Action issued in Chinese Application No. 202010824602.4 on Jun. 29, 2023 and English translation.

Gaoping et al., "Design and implementation of Intelligent Warehouse Management System Based on AGV", Electronic Components and Information Technology, Jul. 2021, vol. 5, Issue 7, (9 pages) English Translation with Non-English original document.

* cited by examiner

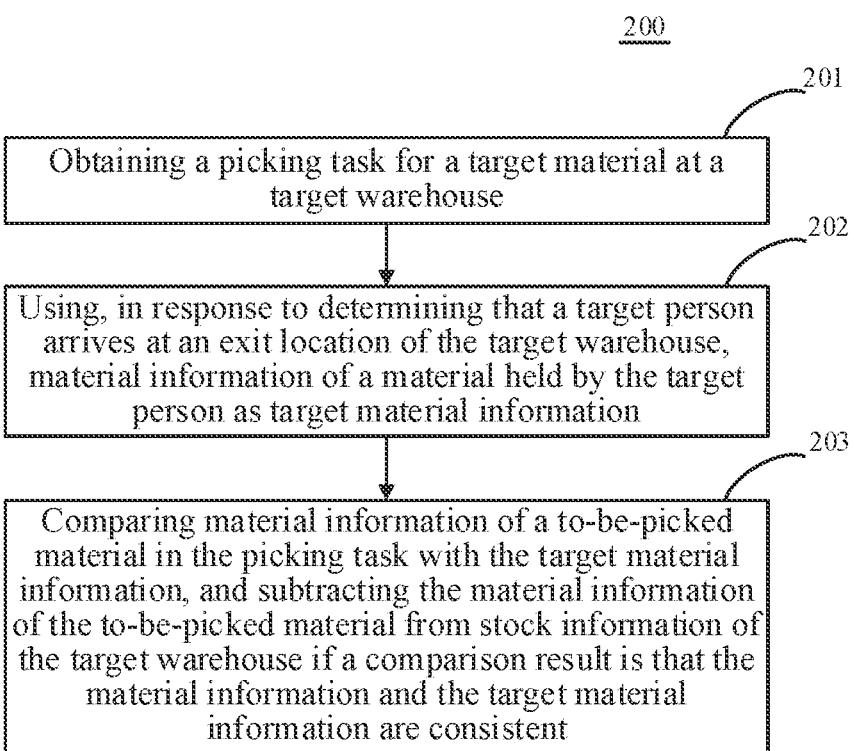

<u>200</u>

201

Obtaining a picking task for a target material at a
target warehouse

202

Using, in response to determining that a target person
arrives at an exit location of the target warehouse,
material information of a material held by the target
person as target material information

203

Comparing material information of a to-be-picked
material in the picking task with the target material
information, and subtracting the material information
of the to-be-picked material from stock information of
the target warehouse if a comparison result is that the
material information and the target material
information are consistent

Fig. 2a

G representing a
gravity shelf

R representing a radio
frequency shelf

System for processing a material 400

Control apparatus

METHOD AND DEVICE FOR HANDLING MATERIAL

CROSS-REFERENCE TO RELATED APPLICATIONS

This patent application is a national stage of International Application No. PCT/CN2021/091323, filed on Apr. 30, 2021, which claims the priority of Chinese Patent Application No. 202010824602.4, filed on Aug. 17, 2020 and entitled "Method and Device for Stock Handling". Both of the aforementioned applications are hereby incorporated by reference in their entireties.

TECHNICAL FIELD

The present disclosure relates to the field of computer technology, specifically to the field of logistics technology, and particularly to a method and for handling a material.

BACKGROUND

In the field of warehousing, since there are many warehouses, one warehouse keeper may be required to manage one or more warehouses at the same time, resulting in a lot of work. With the development of logistics technology, the management for the logistics warehouses is becoming more and more modern.

In the existing technologies, since there is a large number of materials in a warehouse, a large number of various materials need to be placed into the warehouses and picked every day, and while there is a shortage of full-time people for warehouse management, it is difficult to meet the 24-hour logistics requirement of production. Moreover, in the traditional warehousing system, warehouse management people are required to perform complex operations.

SUMMARY

A method and for handling a material, an electronic device and a storage medium are provided.

According to a first aspect, a method for handling a material used for a control apparatus is provided, and the method includes: obtaining a picking task for a target material at a target warehouse; using, in response to determining that a target person arrives at an exit location of the target warehouse, material information of a material held by the target person as target material information, the material information including a material identifier and a material quantity; and comparing material information of a to-be-picked material in the picking task with the target material information, and subtracting the material information of the to-be-picked material from stock information of the target warehouse if a comparison result is that the material information and the target material information are consistent.

According to a second aspect, an electronic device is provided, and the electronic device includes: one or more processors; and a storage apparatus, configured to store one or more programs, where the one or more programs, when executed by the one or more processors, cause the one or more processors to implement the method as described in any implementations of the method for handling a material.

According to a third aspect, a computer readable medium, storing a computer program, where the program, when executed by a processor, implements the method as described in any implementations of the method for handling a material.

BRIEF DESCRIPTION OF THE DRAWINGS

Through detailed descriptions of non-limiting embodiments given with reference to the following accompanying drawings, other features, objectives and advantages of the present disclosure will be more apparent:

FIG. 2a is a flowchart of an embodiment of a method for handling a material according to the present disclosure;

DETAILED DESCRIPTION OF EMBODIMENTS

Exemplary embodiments of the present disclosure are described below in combination with the accompanying drawings, and various details of the embodiments of the present disclosure are included in the description to facilitate understanding, and should be considered as exemplary only. Accordingly, it should be recognized by one of ordinary skill in the art that various changes and modifications may be made to the embodiments described herein without departing from the scope and spirit of the present disclosure. Also, for clarity and conciseness, descriptions of well-known functions and structures are omitted in the following description.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
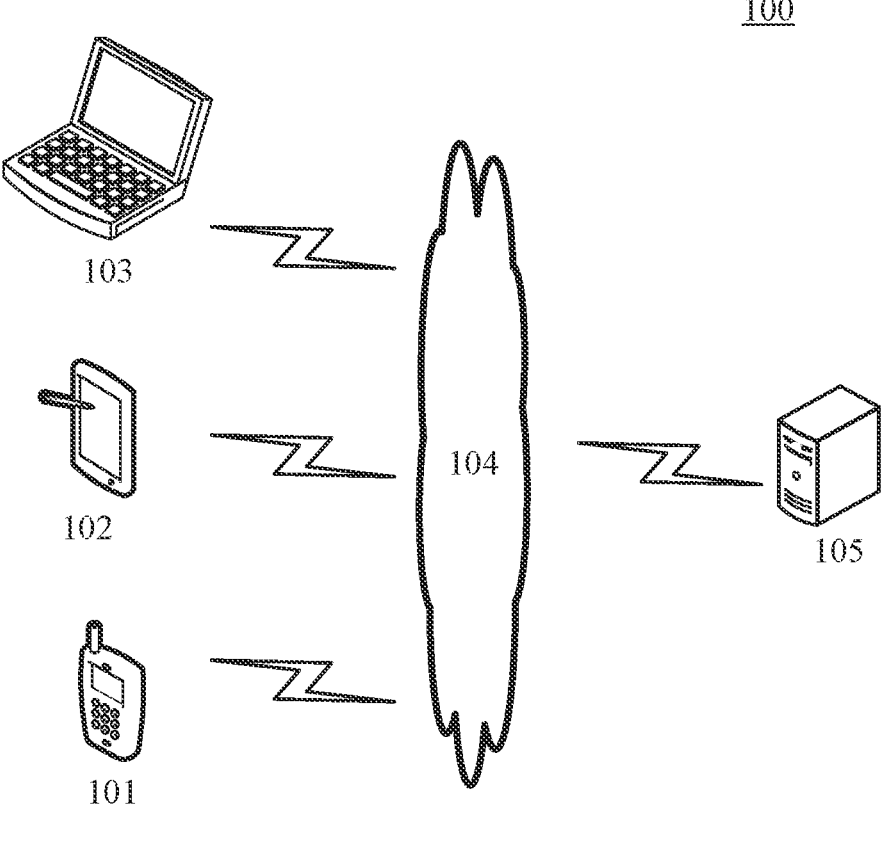
FIG. 1 is a diagram of an exemplary system architecture in which some embodiments of the present disclosure may be applied.

FIG. 1 illustrates an exemplary system architecture 100 in which an embodiment of a method for handling a material or an apparatus for handling a material according to the present disclosure may be applied.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, for example, wired or wireless communication links, or optical fiber cables.

A user may use the terminal devices 101, 102 and 103 to interact with the server 105 via the network 104, to receive or send a message, etc. Various communication client applications (e.g., a picking application, a stock-count application, an RFID application, a live-streaming application, an instant communication tool, a mailbox client, and social platform software) may be installed on the terminal devices 101, 102 and 103.

The terminal devices 101, 102 and 103 here may be hardware or software. When being the hardware, the terminal devices 101, 102 and 103 may be various electronic devices having a display screen, the electronic devices including, but not limited to, a smartphone, a tablet computer, an e-book reader, a laptop portable computer, a desktop computer, and the like. When being the software, the terminal devices 101, 102 and 103 may be installed on the above electronic devices. The terminal devices 101, 102 and 103 may be implemented as a plurality of pieces of software or a plurality of software modules (e.g., software or software modules for providing a distributed service), or may be implemented as a single piece of software or a single software module, which will not be specifically limited here.

The server 105 may be a server providing various services, for example, a backend server providing support for the terminal devices 101, 102 and 103. The backend server may perform processing such as an analysis on received data, and feed back the processing result to the terminal devices.

It should be noted that the method for handling a material provided in the embodiments of the present disclosure may be performed by the server 105 or by the terminal devices 101, 102 and 103. Correspondingly, the apparatus for handling a material may be provided in the server 105 or in the terminal devices 101, 102 and 103.

It should be appreciated that the numbers of the terminal devices, the network and the server in FIG. 1 are merely illustrative. Any number of terminal devices, networks and servers may be provided based on actual requirements.

Figure 2B:
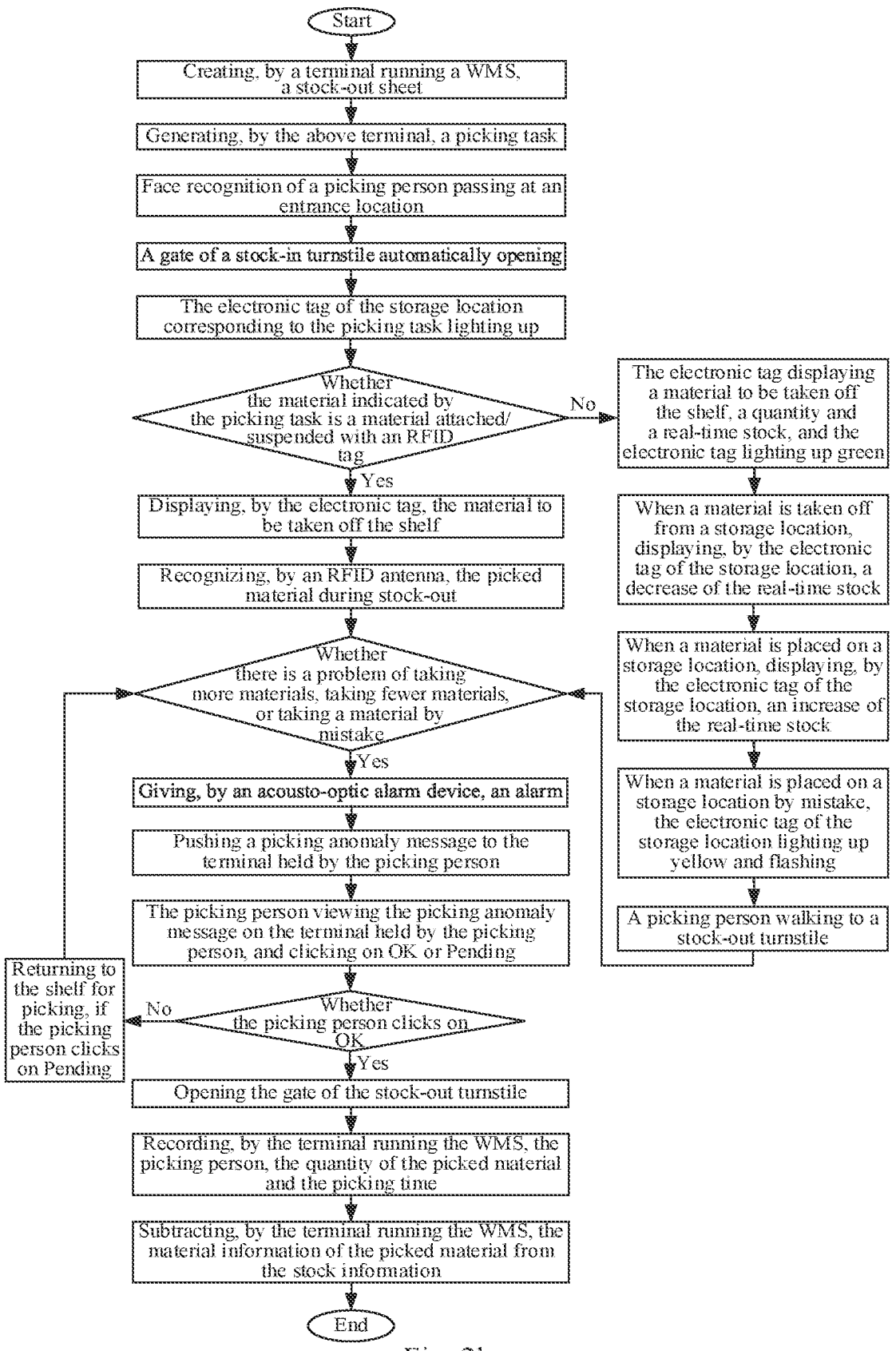
FIG. 2b is a schematic diagram of warehouse scenario of the method for handling a material according to the present disclosure.

Further referring to FIG. 2a, FIG. 2a illustrates a flow 200 of an embodiment of a method for handling a material according to the present disclosure. The method for handling a material, which may be used for a control apparatus, includes the following steps.

Step 201, obtaining a picking task for a target material at a target warehouse.

In this embodiment, an executing body (e.g., the terminal devices or the server shown in FIG. 1) on which the method for handling a material runs may acquire the picking task for the target material at the target warehouse. Specifically, the above executing body may locally generate the picking task or may receive a picking task generated by other electronic devices. In practice, the above executing body or the other electronic devices may refer to an electronic device running a warehouse management system (WMS), for example, may refer to a terminal device running the WMS. Thus, the above executing body and these electronic devices can generate various tasks of a warehouse through the WMS, for example, a picking task (i.e., a stock-out task) and a stock-in task. The above electronic device running the WMS may open a WMS webpage, or may be installed with an application corresponding to the WMS.

In practice, picking is a material stock-out process. The above executing body may first create a stock-out sheet and generate the picking task based on the stock-out sheet. Each picking task may have a picking sheet, including a picking entry for at least one material. For example, the picking entry may include an identifier of a to-be-picked material, a material quantity, and a storage location where the material is.

Step 202, using, in response to determining that a target person arrives at an exit location of the target warehouse, material information of a material held by the target person as target material information, the material information including a material identifier and a material quantity.

In this embodiment, in the situation where it is determined that the target person arrives at the exit location of the above target warehouse, the above executing body may acquire the material information of the material held by the target person, and use the material information as the target material information.

Here, the target person is a picking person who is to conduct picking. When the picking person holding a picked material wants to leave the target warehouse, the material information of the material held by the target person is acquired at a preset exit location of the warehouse.

Here, the material identifier may be an identifier distinguishing different materials. For example, the identifier may include the name of the material such as "motor protection switch," or may include the code of the material such as "324" or "bk."

Step 203, comparing material information of a to-be-picked material in the picking task with the target material information, and subtracting the material information of the to-be-picked material from stock information of the target warehouse if a comparison result is that the material information and the target material information are consistent.

In this embodiment, the above executing body may compare the material information of the to-be-picked material in the picking task with the above target material information, and subtract the material information of the to-be-picked material from the stock information in the situation where the comparison result is that the material information and the target material information are consistent. The to-be-picked material refers to a material required to be picked as indicated by the picking task. The stock information may include a corresponding material identifier and a corresponding material quantity, i.e., correspond to the information in the material information. In addition, the stock information may further include a storage location corresponding to the material information, that is, the storage location where the material indicated by the material information is placed.

According to the method provided in the above embodiment of the present disclosure, by detecting the material information of the material held by the target person and comparing the material information with the material information of the to-be-picked material, the material to be moved out of the warehouse can be automatically checked, which avoids the problem of inaccurate picking.

In some alternative implementations of this embodiment, using the material information of the material held by the target person as the target material information in step 202 may include: determining, when a weight of the target material is within a preset weight range, change material information fed back with respect to a weight-changed target storage location by a target gravity shelf receiving a weight change in the target warehouse as the target material information. Here, the preset weight range respectively takes a first weight value and a second weight value as a weight lower limit value and a weight upper limit value.

In these alternative implementations, when the weight of the target material is within the preset weight range, the above executing body may determine changed material information fed back with respect to the weight-changed target storage location by the gravity shelf receiving the weight change in the above target warehouse, and use the material information as the above target material information.

In practice, there is a gravity shelf in the target warehouse. The gravity shelf can weigh (i.e., measure the weight of) the materials placed thereon, and determine the number of the materials based on the weighing result and the weight of an individual material. When the weight measured at any storage location on the gravity shelf changes, i.e., when the material is placed on or taken down from the storage location, the storage location receives a weight change. If which storage location receives a weight change, the gravity shelf may feed back the changed material information (i.e., the material identifier and material quantity of the changed material) of the storage location to the above executing body. Here, the change material information refers to the changed material information of the target storage location that is obtained by comparing material information before the change with material information after the change.

The target storage location here may refer to all storage locations receiving a weight change during the picking by the target person. The above executing body may use the change material information fed back by each target storage location as the target material information. In this way, the above executing body may compare each piece of target material information with the material information of the to-be-picked material, and find whether there exists each piece of target material information in the material information of the to-be-picked material, or whether there exists each piece of material information of the to-be-picked material in each piece of target material information. If the result of the finding is "Yes", it indicates that the comparison result is that the material information and the target material information are consistent. If the result of the finding is "No", that is, each piece of target material information does not have a one-to-one corresponding relationship with the material quantity and the material identifier in each piece of material information of the to-be-picked material, it indicates that the comparison result is that the material information and the target material information are inconsistent.

If the comparison result is that the material information and the target material information are inconsistent, and the material information of the to-be-picked material is more than the target material information (i.e., the number of the material identifiers of to-be-picked materials is more than the number of the material identifiers in the target material information), the target person takes fewer materials. If the comparison result is that the material information and the target material information are inconsistent, and the material information of the to-be-picked material is less than the target material information, the target person takes more materials. If the comparison result is that the material information and the target material information are inconsistent, and the material information of the to-be-picked material and the target material information are consistent in quantity but the material identifiers therein are inconsistent, the target person takes a material by mistake.

In these implementations, when the weight of the target material is within the preset weight range, the material taken down from the shelf by the target person can be automatically determined using the change material information fed back by the gravity shelf. That is, a material that can be accurately detected can be weighed using a gravity shelf, thereby saving human resources.

In some alternative application scenarios of these implementations, before the material information of the material held by the target person is used as the target material information, the method may further include: acquiring, in response to a gravity shelf of a target storage location where the target material is receiving a weight change, a change material identifier and change material quantity determined by the gravity shelf for the target storage location, when the weight of the target material is within the preset weight range; and using the change material identifier and change material quantity as the change material information.

In these alternative application scenarios, when the weight of the target material is within the preset weight range, the above executing body may acquire, in response to the gravity shelf of the target storage location where the target material is receiving the weight change, the material identifier and changed material quantity that are determined by the gravity shelf and correspond to the target storage location having the weight change, and use respectively the material identifier and changed material quantity as the change material identifier and the change material quantity. The above executing body may use the change material identifier and the change material quantity as the change material information.

In practice, each time a gravity shelf receives a weight change, change material information is generated for indicating a changed material and a changed material quantity. If the above executing body receives change material information sent with respect to the same target storage location by the gravity shelf for at least twice (i.e., receives at least two pieces of change material information) during the picking of the target person, the above executing body may accumulate this change material information to obtain the final change material information. For example, one piece of change material information is the "motor protection switch" being reduced by 1, and the other piece of change material information is the "motor protection switch" being reduced by 2, the finally obtained change material information that is to be compared with the material information of the to-be-picked material is 3 "motor protection switches."

In these application scenarios, the changed material and the changed material quantity can be duly and accurately determined through the gravity shelf.

Alternatively, the above method may further include: acquiring at least two material images collected by a camera for the target storage location. Here, the at least two material images are material images collected from a first moment prior to a weight change moment to a second moment subsequent to the weight change moment, and the camera collecting the at least two material images is used to photograph a material at the target storage location or at the gravity shelf having the target storage location. The using the change material identifier and change material quantity as the change material information may include: using the change material identifier and change material quantity as the change material information, in response to determining that a changed material identifier indicated by a recognition result of the at least two material images is the change material identifier.

Specifically, the above executing body may acquire the at least two material images collected by the camera for the target storage location, and acquire the material quantity determined by the gravity shelf for the above target material. In the situation where it is determined that the recognition result of the at least two images indicates that the changed material is the changed material fed back by the gravity shelf, the above executing body may determine that the material information fed back by the gravity shelf is the change material information.

In practice, the above executing body can acquire the material images at the first moment and the second moment, that is, two material images, and determine the change between the two material images, thereby determining the changed material. For example, the images are photographed for the entire gravity shelf. In the image photographed at the first moment, there exists a motor protection switch at the target storage location, and in the image photographed at the second moment, the motor protection switch disappears. Accordingly, the changed material is the motor protection switch, and the changed material identifier is the identifier of the motor protection switch. Alternatively, the above executing body may acquire a plurality of material images from the first moment to the second moment, and thus obtain a more accurate recognition result using the plurality of material images, to obtain a more accurate changed material identifier.

In these implementations, the change material information fed back by the gravity shelf can be verified by obtaining the image recognition result. Thus, the accuracy of determining the target material information is increased, and the situation where the gravity shelf cannot accurately judge a material by measuring a weight when the weights of different materials are the same or similar is avoided.

Alternatively, the method may further include: sending, in response to determining that the changed material identifier indicated by the recognition result of the at least two material images is not the change material identifier, alarm information to an alarm device to cause the alarm device to given an alarm. Here, the alarm device is a voice alarm device, or an electronic tag corresponding to the target storage location.

After a material comparison is performed using the images, if it is found that the change material identifier sent by the gravity shelf does not match the actual material identifier, the alarm processing may be performed. The voice alarm device here may be provided in each warehouse.

In these application scenarios, the deviation caused by weighing of the gravity shelf can be avoided, which makes the target material information determined during the picking more accurate.

In some alternative implementations of this embodiment, subtracting the material information of the to-be-picked material from stock information of the target warehouse if a comparison result is that the material information and the target material information are consistent in step 203 may include: sending, if the comparison result is that the material information and the target material information are consistent, an open instruction to a stock-out turnstile at the exit location, and subtracting the material information of the to-be-picked material from the stock information.

In these alternative implementations, when the comparison result is that the material information and the target material information are consistent, the above executing body may send the open instruction to the stock-out turnstile at the exit location, to enable the target person to pass through the stock-out turnstile to leave the target warehouse.

In these implementations, it is possible to check the picking of the target person, to release the target person when the target person accurately performs the picking, thereby avoiding the problem of inaccurate picking.

In some alternative application scenarios of these implementations, the method may further include: acquiring a recognition result of a target face image collected at the target storage location in response to the target storage location receiving a weight change; and comparing the recognition result with a person identifier indicated by the picking task to obtain a person-related result. The sending, if the comparison result is that the material information and the target material information are consistent, an open instruction to a stock-out turnstile at the exit location includes: sending the open instruction to the stock-out turnstile at the exit location if the comparison result is that the material information and the target material information are consistent and the person-related result is "consistent."

In these alternative application scenarios, when the target storage location receives the weight change, a camera of the target storage location that is used to photograph a person operating on a material on the target storage location may acquire a face image at the target storage location and use the face image as the target face image. Accordingly, the above executing body may acquire the target face image and acquire the recognition result of the target face image. The recognition result may include a person identifier. Further, the recognition result is compared with the person identifier indicated by the picking task to obtain a comparison result, and the comparison result can be used as the person-related result. In this way, when the comparison result is that the recognition result and the person identifier are consistent and the above comparison result is that the material information and the target material information are consistent, the above executing body may send the open instruction to the stock-out turnstile.

In practice, the above executing body may acquire an image collected by the camera for a target person taking the material on the target storage location down, and use the image as the target face image. Here, the camera collecting the face image is a camera for photographing the face of a person who makes the weight of the target storage location change.

Specifically, the recognition result of the target face image may be generated by the above executing body itself, and the recognition result may include the person identifier corresponding to the face in the face image. The person identifier may be the name and/or code name of the person. In addition, the recognition result may alternatively be a recognition result that is acquired from another electronic device to which the above executing body sends the target face image and obtained by performing image recognition on the target face image.

In practice, at each storage location, there may exist a camera (e.g., a pinhole camera) specifically for photographing the face corresponding to the storage location. If there is a person operating at the storage location, the camera may photograph the person and transmit the photographed face image to the above executing body.

In these application scenarios, it can be determined that the picking person completes the picking when each of the material information and the person information is matched, and thus, the picking person can be released directly.

In some alternative application scenarios of these implementations, the above method may further include: acquiring the recognition result of the target face image collected at the target storage location in response to the target storage location receiving the weight change; comparing the recognition result with a recognition result of a to-be-processed face image to obtain a person-related result; and acquiring a face image photographed by a face camera at the exit location for the target person, and using the face image as the to-be-processed face image. The sending, if the comparison result is that the material information and the target material information are consistent, an open instruction to a stock-out turnstile at the exit location includes: sending the open instruction to the stock-out turnstile at the exit location if the comparison result is that the material information and the target material information are consistent and the person-related result is "consistent."

In these alternative application scenarios, the above executing body may further acquire the face image of the target person detected at the stock-out location, and acquire a recognition result of the face image. The recognition result is compared with the recognition result collected at the target storage location, and the obtained comparison result is used as a person-related result. When the person-related result is "consistent" and the comparison result is that the material information and the target material information are consistent, the above executing body may open the gate of the stock-out turnstile.

In these application scenarios, it can be determined that the picking person completes the picking when each of the material information and the person information is matched, and thus, the picking person can be released directly.

Alternatively, the method may further include: sending, if the person-related result is "inconsistent," alarm information to an alarm device to cause the alarm device to given an alarm. Here, the alarm device is an acousto-optic alarm device, or the electronic tag corresponding to the target storage location.

In these alternative application scenarios, if the above person-related result is "inconsistent," the above executing body may send the alarm information to the alarm device to cause the alarm device to given the alarm.

In practice, the acousto-optic alarm device here may correspond to the target warehouse, i.e., there is only one acousto-optic alarm device in the target warehouse. Alternatively, the acousto-optic alarm device may correspond to the shelf, i.e., one acousto-optic alarm device per shelf. Each gravity shelf may have an electronic tag, which may be provided with an electronic tag lamp. When the electronic tag gives an alarm, the electronic tag lamp may flash light.

In these application scenarios, an alarm may be given when the person taking out the material is not the picking person indicated by the picking task, thereby avoiding the problem of taking the material by a person other than the picking person.

In some alternative implementations of this embodiment, when a weight of a material in the target warehouse is outside the preset weight range, the material is provided with a radio frequency identification (RFID) tag indicating material information. Using the material information of the material held by the target person as the target material information in step 202 may include: determining, when the weight of the target material is outside the preset weight range, material information corresponding to an RFID tag of the material held by the target person by using an RFID antenna at the exit location, and using the material information as the target material information.

In these alternative implementations, when the weight of the target material is outside the preset weight range, the above executing body may detect the RFID tag of the material held by the target person by using the RFID antenna at the exit location, thereby obtaining the material information of the material.

In practice, the above executing body may detect the RFID tag by using both an RFID fixed reader and writer and the RFID antenna, thereby obtaining the material information.

In practice, in the target warehouse, not only gravity shelves may be included, but materials without RFID tags may be stored. In addition, the target warehouse may further include RFID shelves, which may be used to accommodate materials marked with RFID tags.

In these implementations, when the weight of the target material is too large or too small, the material information of the material can be quickly detected through the RFID technology (through the RFID tag carried by the material), which avoids the problem that an accurate result cannot be obtained by weighing the material using the gravity shelf.

In some alternative implementations of this embodiment, after the comparing material information of a to-be-picked material in the picking task with the target material information in step 203, the above method may further include: sending, if the comparison result is that the material information and the target material information are inconsistent, alarm information to an alarm device to cause the alarm device to given an alarm. Here, the alarm device is an acousto-optic alarm device, or the electronic tag corresponding to the target storage location.

In these alternative implementations, when the comparison result is that the material information and the target material information are inconsistent, the above executing body may send the alarm information to the alarm device, to cause the alarm device to given the alarm.

In these implementations, an alarm may be given when the comparison result is that the material information and the target material information are inconsistent, thereby reminding the picking person of a picking error.

In some alternative implementations of this embodiment, after the comparing material information of a to-be-picked material in the picking task with the target material information in step 203, the above method may further include: sending, if the comparison result is that the material information and the target material information are inconsistent, a picking anomaly message to a terminal device held by the target person, to cause the terminal device to display the picking anomaly message, where the picking anomaly message indicates taking more materials, taking fewer materials or taking a material by mistake; and sending open information to the stock-out turnstile at the exit location in response to receiving information sent by the terminal detecting a confirmation operation.

In these alternative implementations, when the comparison result is that the material information and the target material information are inconsistent, the above executing body may send the picking anomaly message to the terminal device held by the target person, to indicate that the material information (material identifier and/or material quantity) during this picking is abnormal. Specifically, picking anomaly information may indicate taking more materials or taking fewer materials, i.e., an anomaly in the material quantity. For example, the picking anomaly message may be "the quantity of the material XX to be picked is A, and the actual quantity is B." In addition, the picking anomaly message may indicate that a material is taken by mistake, that is, the material identifier is abnormal, and may alternatively indicate the quantity of the material taken by mistake, that is, indicate that the quantity of the material is abnormal.

In practice, if the target person performs a confirmation operation on the picking anomaly message displayed by the terminal device, the above executing body may send the open information to the stock-out turnstile. Correspondingly, if the target person performs a non-confirmation operation on the terminal held by the target person, for example, a click on "pending" displayed on the terminal, the target person may return to the shelf for picking again.

In these implementations, the picking anomaly message may be sent to the terminal of the target person, which makes the target person aware of the information about the abnormal picking.

In some alternative implementations of this embodiment, after step 201, the above method may further include: sending, in response to receiving a guidance request of the terminal held by the target person for a target robot, a guidance instruction to the target robot, to cause the target robot to perform an autonomous navigation based on a location of a target shelf indicated by the picking task and travel to an area where the target shelf is. Here, the target robot initiates the autonomous navigation in response to detecting a guidance start operation, and the target robot returns to a target parking location in response to detecting a guidance termination operation.

In these alternative implementations, the above executing body may send the guidance instruction to the target robot if the above executing body receives the guidance request. The guidance instruction may include the picking task, or may include the target shelf indicated by the picking task. The target shelf refers to the shelf where the to-be-picked material indicated by the picking task is. The above guidance request is sent by the terminal device held by the target person, and is used to request the target robot to perform the autonomous navigation according to the picking task to travel to the area of the target shelf indicated by the picking task, thereby guiding the target person to the area where the shelf is. The target robot performs the autonomous navigation by using a location before the traveling and the location of the target shelf indicated by the picking task, thereby generating a traveling route for guidance. In response to the number of target shelves being at least two, the traveling route corresponding to the autonomous navigation is a shortest traveling route determined to complete the traveling to the areas where all the target shelves.

The target user may perform the guidance start operation on the operation panel of the target robot, to cause the target robot to start the guidance. For example, after the target robot arrives at the area of the shelf, the target user may perform the guidance termination operation on the operation panel of the robot, to cause the robot to end the guidance and return to the target parking location. Here, the guidance termination operation may be, for example, an operation of the user on a displayed guidance termination confirmation button after the target robot arrives at the area where the above shelf is. In practice, the guidance request may be a guidance task generated at the terminal held by the target person.

In practice, the number of target shelves indicated by the picking task may be more than one. In such a case, the above robot may calculate the shortest route to the areas where all the target shelves are, thereby helping the picking person to take the least time to complete the entire picking process.

In these implementations, the picking person can use the robot to guide himself for picking, which can not only reduce the probability that the picking person finds a wrong storage location, but also improve the efficiency of the picking person in finding the storage location, and thus, the accuracy and efficiency of the picking are increased, thereby making it easier for the picking person to complete the picking task.

Further referring to FIG. 2a, FIG. 2a is a flowchart of another embodiment of the method for handling a material according to this embodiment. The flowchart illustrates a picking process.

In some alternative implementations of this embodiment, before the obtaining a picking task for a target material at a target warehouse, the above method may further include: obtaining a stock-in task for the target material at the target warehouse; receiving, if the target material is placed on a target storage location of a gravity shelf indicated by the stock-in task, a material quantity determined for the target material by the gravity shelf when the weight of the target material is within the preset weight range, where the preset weight range respectively takes the first weight value and the second weight value as the weight lower limit value and the weight upper limit value; and using material information of the target material and the target storage location as newly added stock information for corresponding storage.

In these alternative implementations, the above executing body may obtain the stock-in task. Specifically, the stock-in task may be generated by the above executing body locally, or may be acquired by the above executing body from another electronic device. In the situation where the weight of the target material is within the preset weight range, if the target material has been placed on the target storage location indicated by the stock-in task, the above executing body may receive the material quantity determined for the target material by the gravity shelf where the target storage location is. In practice, the information returned by the gravity shelf may include the material information of the material, i.e., the material identifier and the material quantity, and may further include the storage location where the material is.

After the above executing body performs the corresponding storage, the stock information includes various information related to the target material, that is, a corresponding material identifier, a corresponding material quantity, and a corresponding target storage location.

In these implementations, in the stock-in stage, the various information of each material may be correspondingly stored in the stock information by using the gravity shelf, which facilitates the use during stock-out.

In some alternative application scenarios of these implementations, the using material information of the target material and the target storage location as newly added stock information for corresponding storage may include: acquiring a target material image collected by the camera for the target material; and acquiring an image recognition result of the target material image, and using the material information of the target material and the target storage location as the newly added stock information for corresponding storage, in response to determining that a material identifier indicated by the image recognition result is a material identifier of the target material.

In these alternative application scenarios, the above executing body may acquire the target material image collected for the target material. The camera may be used to collect images of the material placed on the target storage location or the shelf where the target storage location is. The above executing body may determine whether the material identifier indicated by the image recognition result of the target material image is the material identifier of the target material. If the result of the determination is yes, the above executing body may correspondingly store the material information of the target material and the target storage location.

In these application scenarios, whether the material information determined by the gravity shelf is accurate can be verified by collecting an image of the target material, and the material information can be added to the stock information when the information is accurate.

Alternatively, the above method may further include: sending, in response to determining that the material identifier indicated by the image recognition result is not the material identifier of the target material, alarm information to an alarm device to cause the device to give an alarm. Here, the alarm device is a voice alarm device, or the electronic tag corresponding to the target storage location.

Specifically, in the situation where the determination result is that the material identifier indicated by the image recognition result is not the material identifier of the target material, the above executing body may send the alarm information to the alarm device.

In these alternative application scenarios, the alarm can be given when the material recognized from the image is not the target material, which prevents wrong material information determined by the gravity shelf from being added to the stock information.

In some alternative application scenarios of these implementations, in the situation where the weight of the target material is outside the preset weight range, the target material is a material required to be marked with an RFID tag. The above method may further include: acquiring an RFID tag associated with the material identifier of the target material from a target terminal when the weight of the target material is outside the preset weight range. Here, the target terminal is configured to determine the RFID tag corresponding to the material identifier of the target material. The using the material information of the target material and the target storage location as newly added stock information for corresponding storage may include: using the material information of the target material, the RFID tag and the target storage location as newly added stock information for corresponding storage.

In these alternative application scenarios, the target terminal may be an RFID terminal device, that is, the target terminal may make the material identifier correspond to the RFID tag. In addition, the target terminal may further generate an RFID code distinguishing the target material from other materials. The RFID code may also be used as stock information to be correspondingly stored together with the material information.

After obtaining the RFID tag of the target material, the above executing body may correspondingly store the RFID tag, the material information and the target storage location. The RFID tag here may be a suspended tag or an adhesive tag.

In these application scenarios, when the weight of the target material is too large or too small, the RFID tag may be used to annotate the target material, which avoids the problem that the gravity shelf cannot accurately weigh the material having a too large or too small weight.

Figure 2C:
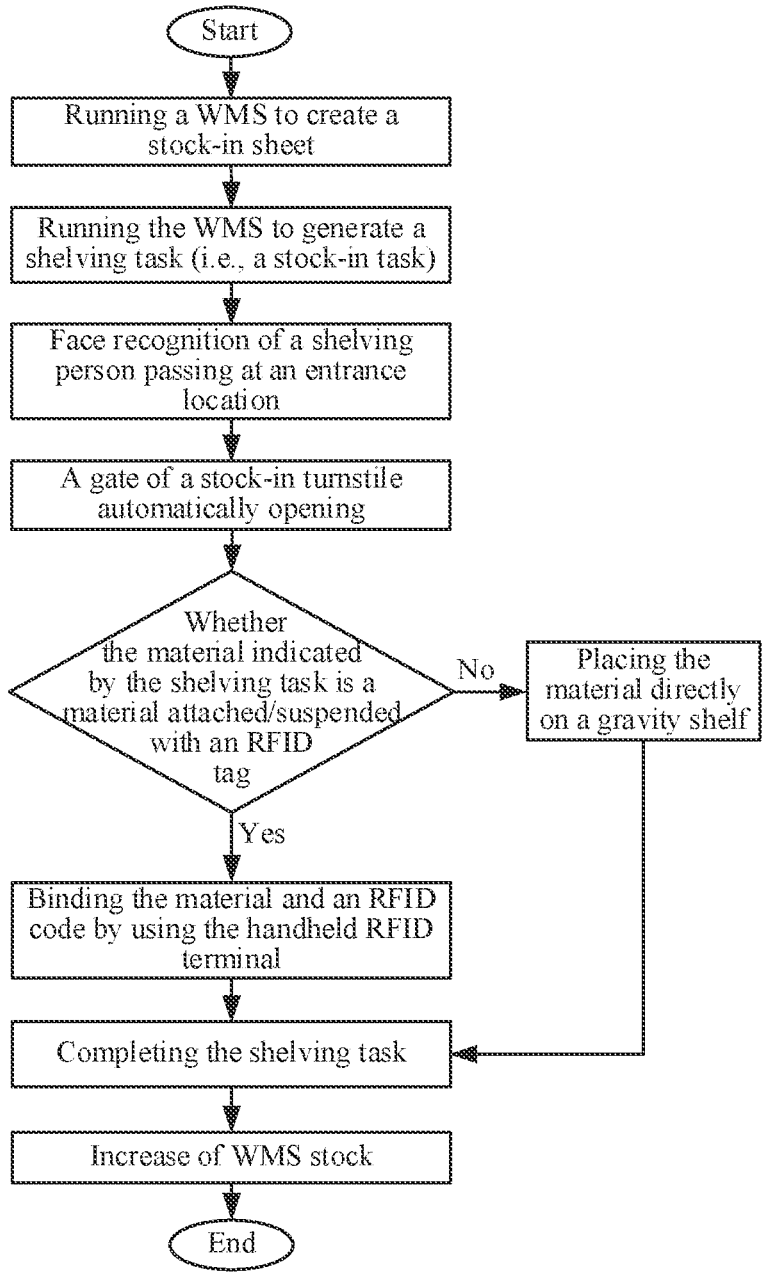
FIG. 2c is a flowchart of another embodiment of the method for handling a material according to the present disclosure.

As shown in FIG. 2c, FIG. 2c is a flowchart of another embodiment of the method for handling a material according to this embodiment. The flowchart illustrates a stock-in process.

In some alternative implementations of this embodiment, there is a corresponding relationship between the material information of a material, an RFID tag and a storage location in stock information. The method may further include: obtaining a stock-count task for a plurality of storage locations; comparing, in response to receiving RFID tags of materials on the plurality of storage locations that are collected for the plurality of storage locations by a handheld RFID terminal and in response to receiving stock-count completion information sent by the handheld RFID terminal in response to detecting a stock-count completion operation, material information and storage locations that correspond to the collected RFID tags with material information corresponding to RFID tags corresponding to the plurality of storage locations in the stock information and the plurality of storage locations, to obtain a first stock comparison result, where the handheld RFID terminal is held by a person or a robot; and generating a difference between comparison participants corresponding to the first stock comparison result in response to the first stock comparison result being "inconsistent."

In these alternative implementations, the above executing body may collect the RFID tags of the materials on the shelf through the handheld RFID terminal. Then, the above handheld RFID terminal may send the collected tags to the above executing body. Accordingly, the above executing body may compare the material information and storage locations that correspond to the collected RFID tags with the material information and storage locations that correspond to the RFID tags corresponding to the plurality of storage locations indicated by the stock-count task.

In the situation where the first stock comparison result is "inconsistent," the above executing body may generate a difference between the material information and storage locations that are obtained through the stock-count and the material information and storage locations in the stock information.

In practice, the handheld RFID terminal may be held by the person or the robot, and the person or the robot may walk around the shelf with the handheld RFID terminal, to realize the collection for the RFID tags. Here, the comparison participants refer to the material information and storage locations that correspond to the collected RFID tags, the material information corresponding to the RFID tags corresponding to the plurality of storage locations in the stock information and the plurality of storage locations.

In these implementations, the RFID tags of the materials on the shelf can be collected through the handheld RFID terminal, and accordingly, the information of the materials on the shelf can be quickly acquired, thereby realizing a rapid and accurate stock-count.

Figures 2D, 2E:
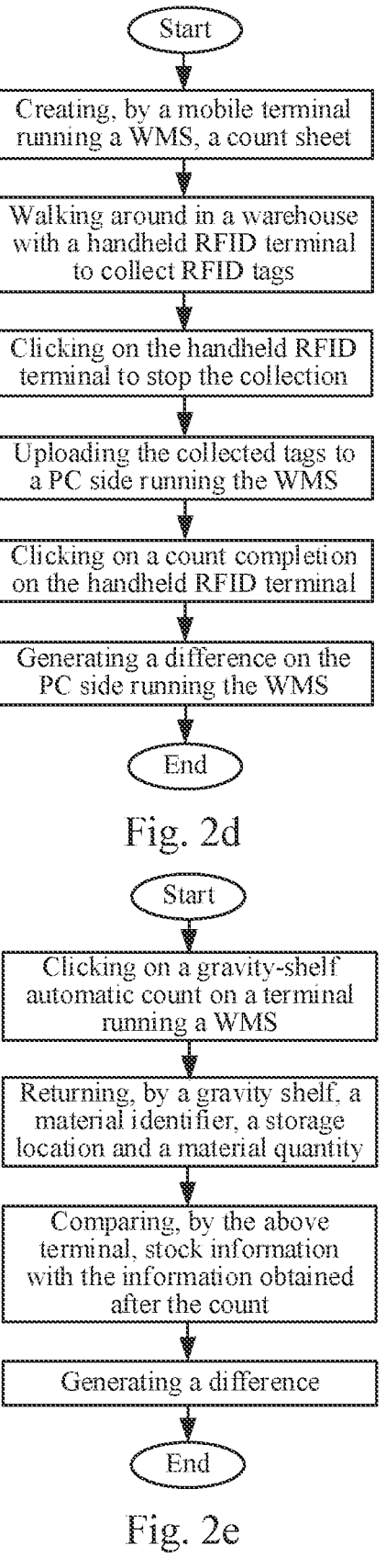
FIG. 2d is a flowchart of another embodiment of the method for handling a material according to the present disclosure.
FIG. 2e is a flowchart of another embodiment of the method for handling a material according to the present disclosure.

As shown in FIG. 2d, FIG. 2d is a flowchart of another embodiment of the method for handling a material according to this embodiment. The flowchart illustrates a stock-count process.

In some alternative implementations of this embodiment, the method may further include: obtaining a stock-count task for a plurality of storage locations; acquiring, in response to the plurality of storage locations being in a gravity shelf, material information and storage locations of materials placed on the plurality of storage locations from the gravity shelf; comparing the acquired material information and storage locations with material information and storage locations of a plurality of materials corresponding to the plurality of storage locations in the stock information, to obtain a second stock comparison result; and generating, in response to the second stock comparison result being "inconsistent," a difference between the acquired material information and storage locations and the material information and storage locations of the plurality of materials in the stock information.

In these alternative implementations, the above executing body may receive the information (i.e., the material information and the storage locations) after the automatic stock-count of the gravity shelf, and compare the information after the stock-count with the stock. If the comparison result is "inconsistent," the above executing body may generate a difference between the material information and storage locations that are obtained through the stock-count and those in the stock information. The stock-count task may be for the plurality of storage locations, or may be for the shelf where the plurality of storage locations is.

In these implementations, the automatic stock-count can be performed using the gravity shelf, which avoids the labor consumption caused by a labor stock-count.

In some alternative implementations of this embodiment, each storage location has a corresponding electronic tag, and the electronic tag is used to display a real-time stock of the storage location. The method further includes: lighting, in response to determining that the target person enters the target warehouse, a tag lamp of an electronic tag corresponding to a storage location indicated by a to-be-completed task, where the to-be-completed task is a stock-in task or a picking task.

In these alternative implementations, the above executing body may control the tag lamp of the electronic tag in the warehouse. When a person enters the warehouse, the above executing body may send a lighting instruction to the electronic tag of the storage location corresponding to the to-be-completed task, to cause the tag lamp of the electronic tag to light up.

In these implementations, the person may be guided to perform a stock-in operation or a picking operation by lighting the electronic tag lamp.

Alternatively, the lighting, in response to determining that the target person enters the target warehouse, a tag lamp of an electronic tag corresponding to a storage location indicated by a to-be-completed task in these implementations may include: acquiring a recognition result of a face image of the target person in response to determining that the target person enters the target warehouse; determining a to-be-completed task corresponding to the recognition result as a target to-be-completed task; and lighting a tag lamp of an electronic tag corresponding to a storage location indicated by the target to-be-completed task.

Specifically, the above executing body may light only the tag lamp corresponding to the person entering the warehouse. The to-be-completed task may include the person identifier of the person completing the task. If the target person enters the warehouse, it may be determined that the face image of the target person is acquired and the recognition result of the face image is acquired, that is, a target person identifier is acquired. It is determined that the target person identifier is used as the person identifier included in the to-be-completed task, and the tag lamp corresponding to the storage location in the to-be-completed task is lit up.

In these implementations, an indication with pertinence may be provided for the target person entering the warehouse.

As shown in FIG. 2e, FIG. 2e is a flowchart of another embodiment of the method of processing a material according to this embodiment. This flowchart illustrates another stock-count process.

Figure 3:
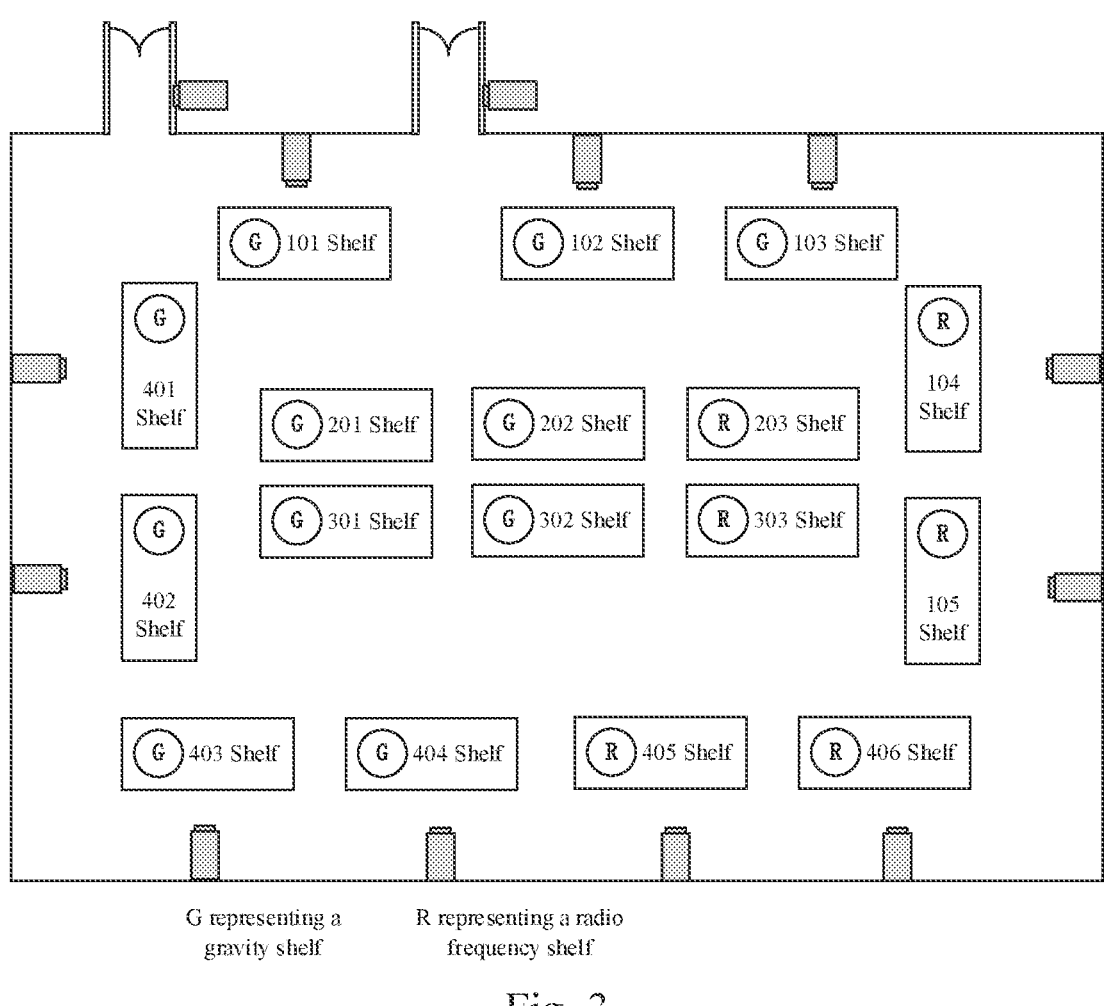
FIG. 3 is a schematic diagram of a warehouse scenario of the method for handling a material according to the present disclosure.

Further referring to FIG. 3, FIG. 3 is a schematic diagram of a warehouse scenario of the method for handling a material according to this embodiment. As shown in FIG. 3, FIG. 3 illustrates a gravity shelf for storing materials within a preset weight range, and further illustrates a radio frequency shelf for storing materials outside the preset weight range.

Figure 4:
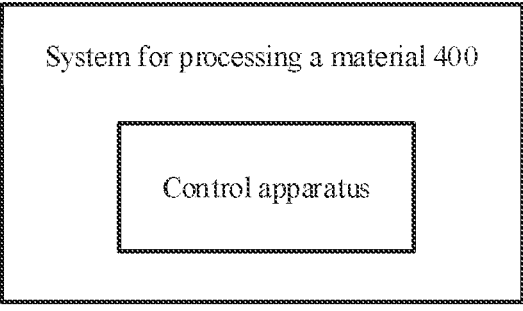
FIG. 4 is a schematic structural diagram of an embodiment of a system for handling a material according to the present disclosure.

Further referring to FIG. 4, FIG. 4 is a schematic structural diagram 400 of an embodiment of a system for handling a material. The schematic structural diagram 400 includes a control apparatus.

The control apparatus is configured to obtain a picking task for a target material at a target warehouse. The control apparatus is further configured to use, in response to determining that a target person arrives at an exit location of the target warehouse, material information of a material held by the target person as target material information, the material information including a material identifier and a material quantity. The control apparatus is further configured to compare material information of a to-be-picked material in the picking task with the target material information, and subtract the material information of the to-be-picked material from stock information of the target warehouse if a comparison result is that the material information and the target material information are consistent.

According to the system provided in this embodiment, by detecting the material information of the material held by the target person and comparing the material information with the material information of the to-be-picked material, the material to be moved out of the warehouse can be automatically checked, which avoids the problem of inaccurate picking.

In some alternative implementations of this embodiment, the above system may further include a gravity shelf. The gravity shelf is configured to send alarm information to an alarm device, in response to determining that a recognition result of at least two images indicates that a material identifier of a material placed on a target storage location is inconsistent with material information corresponding to the target storage location in the stock information after the gravity shelf receives a weight change. Here, the alarm device is an acousto-optic alarm device, or an electronic tag corresponding to the target storage location.

In these alternative implementations, the alarm information may be sent to the alarm device by the gravity shelf. This approach can improve the instantaneity of the alarm.

In some alternative implementations of this embodiment, the above system may further include a stock-out turnstile. The stock-out turnstile is configured to open a gate in response to receiving an open instruction of the control apparatus.

In these implementations, it is possible to check the picking of the target person, to release the target person when the target person accurately performs the picking, thereby avoiding the problem of inaccurate picking.

In some alternative implementations of this embodiment, the above system may further include a target robot. The target robot is configured to perform, in response to detecting a guidance start operation, an autonomous navigation based on a location of a target shelf indicated by the picking task and travel to an area where the target shelf is, if the target robot receives a guidance instruction sent by a terminal held by the target person. Here, in response to a number of target shelves being at least two, a traveling route corresponding to the autonomous navigation is a shortest traveling route determined to complete traveling to areas where all the target shelves are.

In these implementations, the picking person can use the robot to guide himself for picking, which can not only reduce the probability that the picking person finds a wrong storage location, but also improve the efficiency of the picking person in finding the storage location, and thus, the accuracy and efficiency of the picking are increased, thereby making it easier for the picking person to complete the picking task.

In some alternative application scenarios of these implementations, the target robot is further configured to perform the autonomous navigation based on the location of the target shelf indicated by the picking task by: initiating the autonomous navigation in response to detecting the guidance start operation; and returning to a target parking location in response to detecting a guidance termination operation.

In these application scenarios, the accurate control for the robot during the guiding can be implemented through the operation of the picking person.

In some alternative implementations of this embodiment, the system may further include a face recognition apparatus and a stock-in turnstile. The face recognition apparatus is configured to acquire, in response to acquiring a face image at an entrance location of the target warehouse, a face recognition result of the face image, and send an open instruction to the stock-in turnstile in response to determining that a face indicated by the face recognition result is a face of an authorized person. The stock-in turnstile is configured to open a gate in response to receiving the open instruction of the face recognition apparatus.

In these implementations, the identity of the person entering the warehouse can be quickly and accurately verified through the face recognition and the stock-in turnstile.

Figure 5:
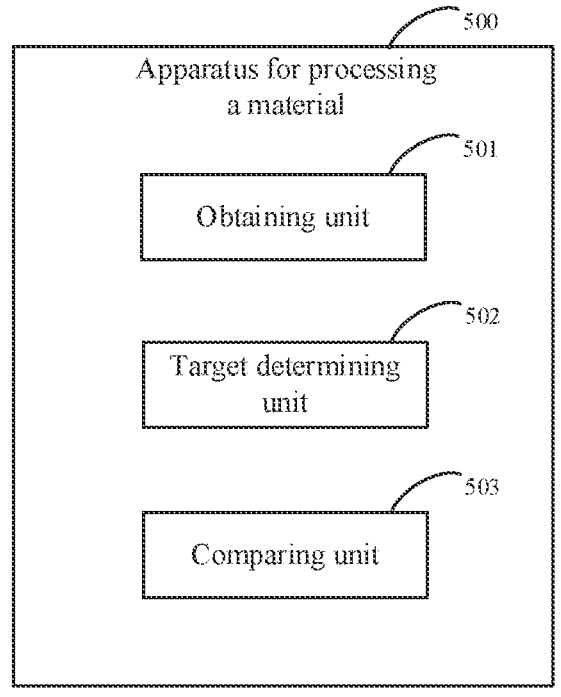
FIG. 5 is a schematic structural diagram of an embodiment of an apparatus for handling a material according to the present disclosure.

Further referring to FIG. 5, as an implementation of the method shown in the above drawings, the present disclosure provides an embodiment of an apparatus for handling a material. The embodiment of the apparatus corresponds to the embodiment of the method shown in FIG. 2. In addition to the features described below, the embodiment of the apparatus may further include the features or effects identical or corresponding to those in the embodiment of the method shown in FIG. 2. The apparatus may be applied in various electronic devices.

As shown in FIG. 5, the apparatus 500 for handling a material in this embodiment includes: an obtaining unit 501, a target determining unit 502 and a comparing unit 503. Here, an apparatus for handling a material is used for a control apparatus. The apparatus for handling a material includes: the obtaining unit 501, configured to obtain a picking task for a target material at a target warehouse; the target determining unit 502, configured to use, in response to determining that a target person arrives at an exit location of the target warehouse, material information of a material held by the target person as target material information, the material information including a material identifier and a material quantity; and the comparing unit 503, configured to compare material information of a to-be-picked material in the picking task with the target material information, and subtract the material information of the to-be-picked material from stock information of the target warehouse if a comparison result is that the material information and the target material information are consistent.

In this embodiment, for specific processes of the obtaining unit 501, the target determining unit 502 and the comparing unit 503 in the apparatus 500 for handling a material, and their technical effects, reference may be respectively made to the related descriptions of step 201, step 202 and step 203 in the corresponding embodiment of FIG. 2, and thus, the details will not be repeatedly described here.

In some alternative implementations of this embodiment, the target determining unit is further configured to use the material information of the material held by the target person as the target material information by: determining, when a weight of the target material is within a preset weight range, change material information fed back with respect to a weight-changed target storage location by a target gravity shelf receiving a weight change in the target warehouse as the target material information. Here, the preset weight range respectively takes a first weight value and a second weight value as a weight lower limit value and a weight upper limit value.

In some alternative implementations of this embodiment, the apparatus further includes: an acquiring unit, configured to acquire, in response to a gravity shelf of a target storage location where the target material is receiving a weight change, a change material identifier and change material quantity determined by the gravity shelf for the target storage location when the weight of the target material is within the preset weight range, before the material information of the material held by the target person is used as the target material information; and a change determining unit, configured to use the change material identifier and change material quantity as the change material information.

In some alternative implementations of this embodiment, the apparatus further includes: an image determining unit, configured to acquire at least two material images collected by a camera for the target storage location. Here, the at least two material images are material images collected from a first moment prior to a weight change moment to a second moment subsequent to the weight change moment, and the camera collecting the at least two material images is used to photograph a material at the target storage location or at the gravity shelf having the target storage location. The change determining unit is further configured to use the change material identifier and change material quantity as the change material information by: using the change material identifier and change material quantity as the change material information, in response to determining that a changed material identifier indicated by a recognition result of the at least two material images is the change material identifier.

In some alternative implementations of this embodiment, the apparatus further includes: a first alarm unit, configured to send, in response to determining that the changed material identifier indicated by the recognition result of the at least two material images is not the change material identifier, alarm information to an alarm device to cause the alarm device to given an alarm. Here, the alarm device is a voice alarm device, or an electronic tag corresponding to the target storage location.

In some alternative implementations of this embodiment, the comparing unit is further configured to subtract, if the comparison result is that the material information and the target material information are consistent, the material information of the to-be-picked material from stock information of the target warehouse by: sending, if the comparison result is that the material information and the target material information are consistent, an open instruction to a stock-out turnstile at the exit location, and subtracting the material information of the to-be-picked material from the stock information.

In some alternative implementations of this embodiment, the apparatus further includes: a result acquiring unit, configured to acquire a recognition result of a target face image collected at the target storage location in response to the target storage location receiving a weight change; and a result obtaining unit, configured to compare the recognition result with a person identifier indicated by the picking task to obtain a person-related result. The comparing unit is further configured to send, if the comparison result is that the material information and the target material information are consistent, the open instruction to the stock-out turnstile at the exit location by: sending the open instruction to the stock-out turnstile at the exit location if the comparison result is that the material information and the target material information are consistent and the person-related result is "consistent."

In some alternative implementations of this embodiment, the apparatus further includes: a second alarm unit, configured to send, if the person-related result is "inconsistent," alarm information to an alarm device to cause the alarm device to give an alarm. Here, the alarm device is an acousto-optic alarm device, or the electronic tag corresponding to the target storage location.

In some alternative implementations of this embodiment, when a weight of a material in the target warehouse is outside the preset weight range, the material is provided with a radio frequency identification (RFID) tag indicating material information. The target determining unit is further configured to use the material information of the material held by the target person as the target material information by: determining, when the weight of the target material is outside the preset weight range, material information corresponding to an RFID tag of the material held by the target person by using an RFID antenna at the exit location, and using the material information as the target material information. Here, the preset weight range respectively takes the first weight value and the second weight value as the weight lower limit value and the weight upper limit value.

In some alternative implementations of this embodiment, the apparatus further includes: a third alarm unit, configured to send, after the material information of the to-be-picked material in the picking task is compared with the target material information, alarm information to an alarm device if the comparison result is that the material information and the target material information are inconsistent, to cause the alarm device to give an alarm. Here, the alarm device is an acousto-optic alarm device, or the electronic tag corresponding to the target storage location.

In some alternative implementations of this embodiment, the apparatus further includes: an anomaly occurring unit, configured to send, after the material information of the to-be-picked material in the picking task is compared with the target material information, a picking anomaly message to a terminal held by the target person if the comparison result is that the material information and the target material information are inconsistent, to cause the terminal to display the picking anomaly message, where the picking anomaly message indicates taking more materials, taking fewer materials or taking a material by mistake; and an opening unit, configured to send open information to the stock-out turnstile at the exit location in response to receiving information sent by the terminal detecting a confirmation operation.

In some alternative implementations of this embodiment, the apparatus further includes: an instructing unit, configured to send, in response to receiving a guidance request of the terminal held by the target person for a target robot, a guidance instruction to the target robot after the picking task for the target material at the target warehouse is obtained, to cause the target robot to perform an autonomous navigation based on a location of a target shelf indicated by the picking task and travel to an area where the target shelf is. Here, the target robot initiates the autonomous navigation in response to detecting a guidance start operation, and returns to a target parking location in response to detecting a guidance termination operation, and in response to the number of target shelves being at least two, a traveling route corresponding to the autonomous navigation is a shortest traveling route determined to complete traveling to areas where all the target shelves are.

In some alternative implementations of this embodiment, the apparatus further includes: a first stock-in unit, configured to obtain a stock-in task for the target material at the target warehouse before the picking task for the target material at the target warehouse is obtained; a second stock-in unit, configured to receive, if the target material is placed on a target storage location of a gravity shelf indicated by the stock-in task, a material quantity determined for the target material by the gravity shelf when the weight of the target material is within the preset weight range, where the preset weight range respectively takes the first weight value and the second weight value as the weight lower limit value and the weight upper limit value; and a third stock-in unit, configured to use material information of the target material and the target storage location as stock information for corresponding storage.

In some alternative implementations of this embodiment, the third stock-in unit is further configured to use the material information of the target material and the target storage location as the newly added stock information for corresponding storage by: acquiring a target material image collected by the camera for the target material; acquiring an image recognition result of the target material image; and using the material information of the target material and the target storage location as the stock information for corresponding storage, in response to determining that a material identifier indicated by the image recognition result is a material identifier of the target material.

In some alternative implementations of this embodiment, the apparatus further includes: a fourth alarm unit, configured to send, in response to determining that the material identifier indicated by the image recognition result is not the material identifier of the target material, alarm information to an alarm device to cause the device to give an alarm. Here, the alarm device is a voice alarm device, or the electronic tag corresponding to the target storage location.

In some alternative implementations of this embodiment, when the weight of the target material is outside the preset weight range, the target material is a material required to be marked with an RFID tag. The apparatus further includes: a tag acquiring unit, configured to acquire an RFID tag associated with the material identifier of the target material from a target terminal when the weight of the target material is outside the preset weight range. Here, the target terminal is configured to determine the RFID tag corresponding to the material identifier of the target material. The third stock-in unit is further configured to use the material information of the target material and the target storage location as the stock information for corresponding storage by: using the material information of the target material, the RFID tag and the target storage location as stock information for corresponding storage.

In some alternative implementations of this embodiment, there is a corresponding relationship between material information of a material, an RFID tag and a storage location in stock information. The apparatus further includes: a first stock-count unit, configured to obtain a stock-count task for a plurality of storage locations; a second stock-count unit, configured to compare, in response to receiving RFID tags of materials on the plurality of storage locations that are collected for the plurality of storage locations by a handheld RFID terminal and in response to receiving stock-count completion information sent by the handheld RFID terminal in response to detecting a stock-count completion operation, material information and storage locations that correspond to the collected RFID tags with material information corresponding to RFID tags corresponding to the plurality of storage locations in the stock information and the plurality of storage locations, to obtain a first stock comparison result, where the handheld RFID terminal is held by a person or a robot; and a third stock-count unit, configured to generate a difference between comparison participants corresponding to the first stock comparison result in response to the first stock comparison result being "inconsistent."

In some alternative implementations of this embodiment, the apparatus further includes: a fourth stock-count unit, configured to obtain a stock-count task for a plurality of storage locations; a fifth stock-count unit, configured to acquire, in response to the plurality of storage locations being in a gravity shelf, material information and storage locations of materials placed on the plurality of storage locations from the gravity shelf; a sixth stock-count unit, configured to compare the acquired material information and storage locations with material information and storage locations of a plurality of materials corresponding to the plurality of storage locations in the stock information, to obtain a second stock comparison result; and a seventh stock-count unit, configured to generate, in response to the second stock comparison result being "inconsistent," a difference between the acquired material information and storage locations and the material information and storage locations of the plurality of materials in the stock information.

In some alternative implementations of this embodiment, the apparatus further includes: a face result acquiring unit, configured to acquire the recognition result of the target face image collected at the target storage location in response to the target storage location receiving the weight change; a person comparing unit, configured to compare the recognition result with a recognition result of a to-be-processed face image to obtain a person-related result; and a pending unit, configured to acquire a face image photographed by a face camera at the exit location for the target person, and use the face image as the to-be-processed face image. The comparing unit is further configured to send, if the comparison result is that the material information and the target material information are consistent, the open instruction to the stock-out turnstile at the exit location by: sending the open instruction to the stock-out turnstile at the exit location if the comparison result is that the material information and the target material information are consistent and the person-related result is "consistent."

In some alternative implementations of this embodiment, each storage location has a corresponding electronic tag, and the electronic tag is used to display a real-time stock of the storage location. In response to determining that the target person enters the target warehouse, a tag lamp of an electronic tag corresponding to a storage location indicated by a to-be-completed task is lit. Here, the to-be-completed task is a stock-in task or a picking task.

In some alternative implementations of this embodiment, each storage location has a corresponding electronic tag, and the electronic tag is used to display a real-time stock of the storage location. The above apparatus further includes: a lighting unit, configured to light, in response to determining that the target person enters the target warehouse, a tag lamp of an electronic tag corresponding to a storage location indicated by a to-be-completed task. Here, the to-be-completed task is a stock-in task or a picking task.

In some alternative implementations of this embodiment, the lighting unit is further configured to light, in response to determining that the target person enters the target warehouse, the tag lamp of the electronic tag corresponding to the storage location indicated by the to-be-completed task by: acquiring a recognition result of a face image of the target person in response to determining that the target person enters the target warehouse; determining a to-be-completed task corresponding to the recognition result as a target to-be-completed task; and lighting a tag lamp of an electronic tag corresponding to a storage location indicated by the target to-be-completed task.

According to an embodiment of the present disclosure, the present disclosure further provides an electronic device, and a readable storage medium.

Figure 6:
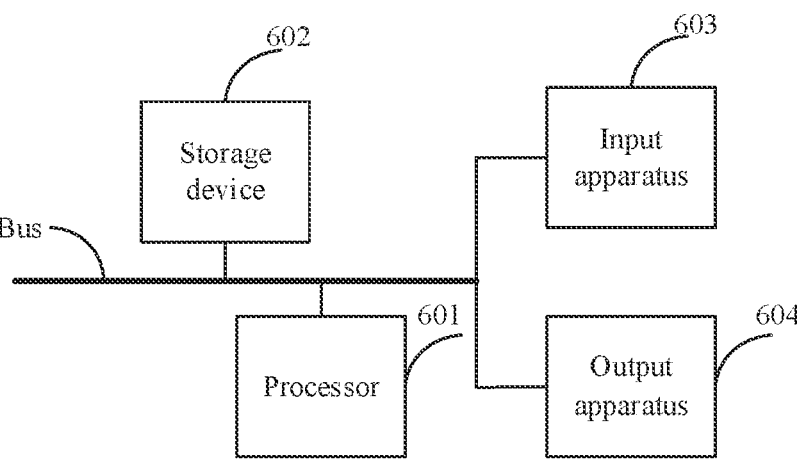
FIG. 6 is a block diagram of an electronic device used to implement the method for handling a material according to the embodiments of the present disclosure.

As shown in FIG. 6, FIG. 6 is a block diagram of an electronic device of the method for handling a material according to the embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may alternatively represent various forms of mobile apparatuses such as personal digital processing, a cellular telephone, a smart phone, a wearable device and other similar computing apparatuses. The parts shown herein, their connections and relationships, and their functions are only as examples, and not intended to limit implementations of the present disclosure as described and/or claimed herein.

As shown in FIG. 6, the electronic device includes: one or more processors 601, a memory 602, and interfaces for connecting various components, including high-speed interfaces and low-speed interfaces. The various components are interconnected using different buses and may be mounted on a common motherboard or otherwise as desired. The processor may process instructions executed within the electronic device, including instructions stored in or on the memory to display graphical information of a GUI on an external input/output apparatus, such as a display device coupled to the interface. In other embodiments, a plurality of processors and/or a plurality of buses may be used with a plurality of memories and a plurality of memories, if desired. Likewise, a plurality of electronic devices may be connected, each providing some of the necessary operations (e.g., as a server array, a set of blade servers, or a multi-processor system). One processor 601 is used as an example in FIG. 6.

The memory 602 is a non-transitory computer readable storage medium provided by the present disclosure. The memory stores instructions executable by at least one processor, so that the at least one processor executes the method for handling a material provided by the present disclosure. The non-transitory computer readable storage medium of the present disclosure stores computer instructions, and the computer instructions are used to cause the computer to perform the method for handling a material provided by the present disclosure.

As a non-transitory computer readable storage medium, the memory 602 may be used to store non-transitory software programs, non-transitory computer-executable programs, and modules, such as program instructions/modules (for example, the obtaining unit 501, the target determining unit 502, and the comparing unit 503 shown in FIG. 5) corresponding to the method for handling a material in the embodiments of the present disclosure. The processor 601 executes various functional applications and data processing of the server by running the non-transitory software programs, instructions and modules stored in the memory 602, that is, implements the method for handling a material in the above method embodiments.

The memory 602 may include a stored program area and a stored data area, where the stored program area may store an operating system, an application program required by at least one function; and the stored data area may store data created according to the use of the electronic device for handling a material, etc. Additionally, the memory 602 may include a high-speed random access memory, and may also include a non-transitory memory, such as at least one magnetic disk storage device, a flash memory device, or other non-transitory solid-state storage device. In some embodiments, the memory 602 may optionally include memories located remotely from the processor 601, and these remote memories may be connected to the electronic device for handling a material via a network. Examples of such network include, but are not limited to, the Internet, an intranet, a local area network, a mobile communication network, and combinations thereof.

The electronic device of the method for handling a material may further include: an input apparatus 603 and an output apparatus 604. The processor 601, the memory 602, the input apparatus 603 and the output apparatus 604 may be connected via a bus or in other ways, and the connection via a bus is used as an example in FIG. 6.

The input apparatus 603 may receive input digital or character information, and generate key signal inputs related to user settings and function control of the electronic device of the method for processing parking, such as touch screen, keypad, mouse, trackpad, touchpad, pointing stick, one or more mouse buttons, trackball, joystick and other input apparatuses. The output apparatus 604 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), the Internet, and blockchain networks.

The computer system may include a client and a server. The client and the server are generally far from each other and usually interact through the communication network. The relationship between the client and the server is generated by computer programs that run on the corresponding computer and have a client-server relationship with each other.

The flow charts and block diagrams in the figures illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, functions annotated in the blocks may also occur in an order different from the order annotated in the figures. For example, any two blocks presented in succession may be executed substantially in parallel, or sometimes be executed in a reverse sequence, depending on the functions involved. It should also be noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The described units involved in the embodiments of the present disclosure may be implemented by means of software or hardware. The described unit can alternatively be provided in a processor, which, for example, can be described as: a processor including an obtaining unit, a target determining unit and a comparing unit. Here, the names of these units do not in some cases constitute a limitation to such units themselves. For example, the obtaining unit may alternatively be described as "a unit for obtaining a picking task for a target material at a target warehouse."

On the other hand, the present disclosure further provides a computer readable medium. The computer readable medium may be the computer readable medium included in the apparatus described in the above embodiment, or a stand-alone computer readable medium not assembled into the apparatus. The above computer readable medium carries one or more programs. The one or more programs, when executed by the apparatus, cause the apparatus to: obtain a picking task for a target material at a target warehouse; use, in response to determining that a target person arrives at an exit location of the target warehouse, material information of a material held by the target person as target material information, the material information including a material identifier and a material quantity; and compare material information of a to-be-picked material in the picking task with the target material information, and subtract the material information of the to-be-picked material from stock information of the target warehouse if a comparison result is that the material information and the target material information are consistent.

The above description only provides explanation of the preferred embodiments and the employed technical principles of the present disclosure. It should be appreciated by those skilled in the art that the inventive scope involved in embodiments of the present disclosure is not limited to the technical solutions formed by the particular combinations of the above technical features. The inventive scope should also cover other technical solutions formed by any combination of the above technical features or equivalent features thereof without departing from the inventive concept of the present disclosure, for example, the technical solutions formed by interchanging the above features with, but not limited to, technical features with similar functions disclosed in the embodiments of the present disclosure.

What is claimed is:

1. A method for handling a material, used for a control apparatus, the method comprising:

obtaining a picking task for a target material at a target warehouse;

using, in response to determining that a target person arrives at an exit location of the target warehouse, material information of a material held by the target person as target material information, the material information comprising a material identifier and a material quantity; and comparing material information of a to-be-picked material in the picking task with the target material information, to obtain a comparison result, and in response to the comparison result being that the material information and the target material information are consistent, sending an open instruction to a stock-out turnstile at the exit location and controlling the stock-out turnstile to open, and subtracting the material information of the to-be-picked material from stock information of the target warehouse.

2. The method according to claim 1, wherein the using the material information of the material held by the target person as the target material information comprises:

determining, when a weight of the target material is within a preset weight range, change material information fed back with respect to a weight-changed target storage location by a target gravity shelf receiving a weight change in the target warehouse as the target material information, wherein the preset weight range respectively takes a first weight value and a second weight value as a weight lower limit value and a weight upper limit value.

3. The method according to claim 2, wherein before the material information of the material held by the target person is used as the target material information, the method further comprises:

acquiring, in response to the gravity shelf of the target storage location where the target material is receiving a weight change, a change material identifier and change material quantity determined by the gravity shelf for the target storage location, when the weight of the target material is within the preset weight range; and using the change material identifier and change material quantity as the change material information.

4. The method according to claim 3, further comprising:

acquiring at least two material images collected by a camera for the target storage location, wherein the at least two material images are material images collected from a first moment prior to a weight change moment to a second moment subsequent to the weight change moment, and the camera collecting the at least two material images is used to photograph a material at the target storage location or at the gravity shelf having the target storage location, wherein the using the change material identifier and change material quantity as the change material information comprises:

using the change material identifier and change material quantity as the change material information, in response to determining that a changed material identifier indicated by a recognition result of the at least two material images is the change material identifier.

5. The method according to claim 4, further comprising:

sending, in response to determining that the changed material identifier indicated by the recognition result of the at least two material images is not the change material identifier, alarm information to an alarm device to cause the alarm device to given an alarm, wherein the alarm device is a voice alarm device, or an electronic tag corresponding to the target storage location.

6. The method according to claim 1, further comprising:

acquiring a recognition result of a target face image collected at the target storage location in response to the target storage location receiving a weight change; and comparing the recognition result with a person identifier indicated by the picking task to obtain a person-related result, wherein the response to the comparison result being that the material information and the target material information are consistent, sending an open instruction to a stock-out turnstile at the exit location comprises:

sending the open instruction to the stock-out turnstile at the exit location in response to the comparison result being that the material information and the target material information are consistent and the person-related result is "consistent".

7. The method according to claim 1, further comprising:

acquiring the recognition result of the target face image collected at the target storage location in response to the target storage location receiving the weight change;

comparing the recognition result with a recognition result of a to-be-processed face image to obtain a person-related result; and acquiring a face image photographed by a face camera at the exit location for the target person, and using the face image as the to-be-processed face image, wherein the response to the comparison result being that the material information and the target information are consistent, sending an open instruction to a stock-out turnstile at the exit location comprises:

sending the open instruction to the stock-out turnstile at the exit location in response to the comparison result being that the material information and the target material information are consistent and the person-related result is "consistent".

8. The method according to claim 1, wherein, when a weight of a material in the target warehouse is outside the preset weight range, the material is provided with a radio frequency identification (RFID) tag indicating material information, and using the material information of the material held by the target person as the target material information comprises:

determining, when the weight of the target material is outside the preset weight range, material information corresponding to an RFID tag of the material held by the target person by using an RFID antenna at the exit location, and using the material information as the target material information, wherein the preset weight range respectively takes the first weight value and the second weight value as the weight lower limit value and the weight upper limit value.

9. The method according to claim 1, wherein, after the comparing the material information of the to-be-picked material in the picking task with the target material information, the method further comprises:

sending, if the comparison result is that the material information and the target material information are inconsistent, alarm information to an alarm device to cause the alarm device to give an alarm, wherein the alarm device is an acousto-optic alarm device, or the electronic tag corresponding to the target storage location.

10. The method according to claim 1, wherein, after the comparing the material information of the to-be-picked material in the picking task with the target material information, the method further comprises:

sending, if the comparison result is that the material information and the target material information are inconsistent, a picking anomaly message to a terminal held by the target person, to cause the terminal to display the picking anomaly message, wherein the picking anomaly message indicates taking more materials, taking fewer materials or taking a material by mistake; and sending open information to the stock-out turnstile at the exit location in response to receiving information sent by the terminal detecting a confirmation operation.

11. The method according to claim 1, wherein, after the obtaining the picking task for the target material at the target warehouse, the method further comprises:

sending, in response to receiving a guidance request of the terminal held by the target person for a target robot, a guidance instruction to the target robot, to cause the target robot to perform an autonomous navigation based on a location of a target shelf indicated by the picking task and travel to an area where the target shelf is, wherein the target robot initiates the autonomous navigation in response to detecting a guidance start operation and returns to a target parking location in response to detecting a guidance termination operation, and in response to the number of target shelves being at least two, a traveling route corresponding to the autonomous navigation is a shortest traveling route determined to complete traveling to areas where all the target shelves are.

12. The method according to claim 1, wherein, before the obtaining the picking task for the target material at the target warehouse, the method further comprises:

obtaining a stock-in task for the target material at the target warehouse;

receiving, if the target material is placed on a target storage location of a gravity shelf indicated by the stock-in task, a material quantity determined for the target material by the gravity shelf when the weight of the target material is within the preset weight range, wherein the preset weight range respectively takes the first weight value and the second weight value as the weight lower limit value and the weight upper limit value; and using material information of the target material and the target storage location as newly added stock information for corresponding storage.

13. The method according to claim 12, wherein the using material information of the target material and the target storage location as newly added stock information for corresponding storage comprises:

acquiring a target material image collected by the camera for the target material;

acquiring an image recognition result of the target material image; and using the material information of the target material and the target storage location as the newly added stock information for the corresponding storage, in response to determining that a material identifier indicated by the image recognition result is a material identifier of the target material.

14. The method according to claim 12, wherein, when the weight of the target material is outside the preset weight range, the target material is a material required to be marked with an RFID tag, the method further comprises:

acquiring an RFID tag associated with the material identifier of the target material from a target terminal when the weight of the target material is outside the preset weight range, wherein the target terminal is configured to determine the RFID tag corresponding to the material identifier of the target material, and the using material information of the target material and the target storage location as newly added stock information for corresponding storage comprises:

using the material information of the target material, the RFID tag and the target storage location as newly added stock information for the corresponding storage.

15. The method according to claim 1, wherein there is a corresponding relationship between material information of a material, an RFID tag and a storage location in stock information;

the method further comprises:

obtaining a stock-count task for a plurality of storage locations;

comparing, in response to receiving RFID tags of materials on the plurality of storage locations that are collected for the plurality of storage locations by a handheld RFID terminal and in response to receiving stock-count completion information sent by the handheld RFID terminal in response to detecting a stock-count completion operation, material information and storage locations that correspond to the collected RFID tags with material information corresponding to RFID tags corresponding to the plurality of storage locations in the stock information and the plurality of storage locations, to obtain a first stock comparison result, wherein the handheld RFID terminal is held by a person or a robot; and generating a difference between comparison participants corresponding to the first stock comparison result in response to the first stock comparison result being "inconsistent".

16. The method according to claim 1, the method further comprising:

obtaining a stock-count task for a plurality of storage locations;

acquiring, in response to the plurality of storage locations being in a gravity shelf, material information and storage locations of materials placed on the plurality of storage locations from the gravity shelf;

comparing the acquired material information and storage locations with material information and storage locations of a plurality of materials corresponding to the plurality of storage locations in the stock information, to obtain a second stock comparison result; and generating, in response to the second stock comparison result being "inconsistent," a difference between the acquired material information and storage locations and the material information and storage locations of the plurality of materials in the stock information.

17. The method according to claim 1, wherein each storage location has a corresponding electronic tag, the electronic tag is used to display a real-time stock of the storage location, and the method further comprises:

lighting, in response to determining that the target person enters the target warehouse, a tag lamp of an electronic tag corresponding to a storage location indicated by a to-be-completed task, wherein the to-be-completed task is a stock-in task or a picking task.

18. An electronic device, comprising:

one or more processors; and a storage apparatus, configured to store one or more programs, wherein the one or more programs, when executed by the one or more processors, cause the one or more processors to implement operations comprising:

obtaining a picking task for a target material at a target warehouse;

using, in response to determining that a target person arrives at an exit location of the target warehouse, material information of a material held by the target person as target material information, the material information comprising a material identifier and a material quantity; and comparing material information of a to-be-picked material in the picking task with the target material information to obtain a comparison result, and in response to the comparison result being that the material information and the target material information are consistent, and sending an open instruction to a stock-out turnstile at the exit location and controlling the stock-out turnstile to open, and subtracting the material information of the to-be-picked material from stock information of the target warehouse.

19. A non-transitory computer readable medium, storing a computer program, wherein the program, when executed by a processor, implements operations comprising:

obtaining a picking task for a target material at a target warehouse;

using, in response to determining that a target person arrives at an exit location of the target warehouse, material information of a material held by the target person as target material information, the material information comprising a material identifier and a material quantity; and comparing material information of a to-be-picked material in the picking task with the target material information to obtain a comparison result, and in response to the comparison result being that the material information and the target material information are consistent, sending an open instruction to a stock-out turnstile at the exit location and controlling the stock-out turnstile to open, and subtracting the material information of the to-be-picked material from stock information of the target warehouse.

* * * * *